Feb. 4, 1969     A. G. BODINE, JR     3,425,232
UNDERGROUND CABLE INSERTING BY SONICS
Filed Sept. 27, 1965
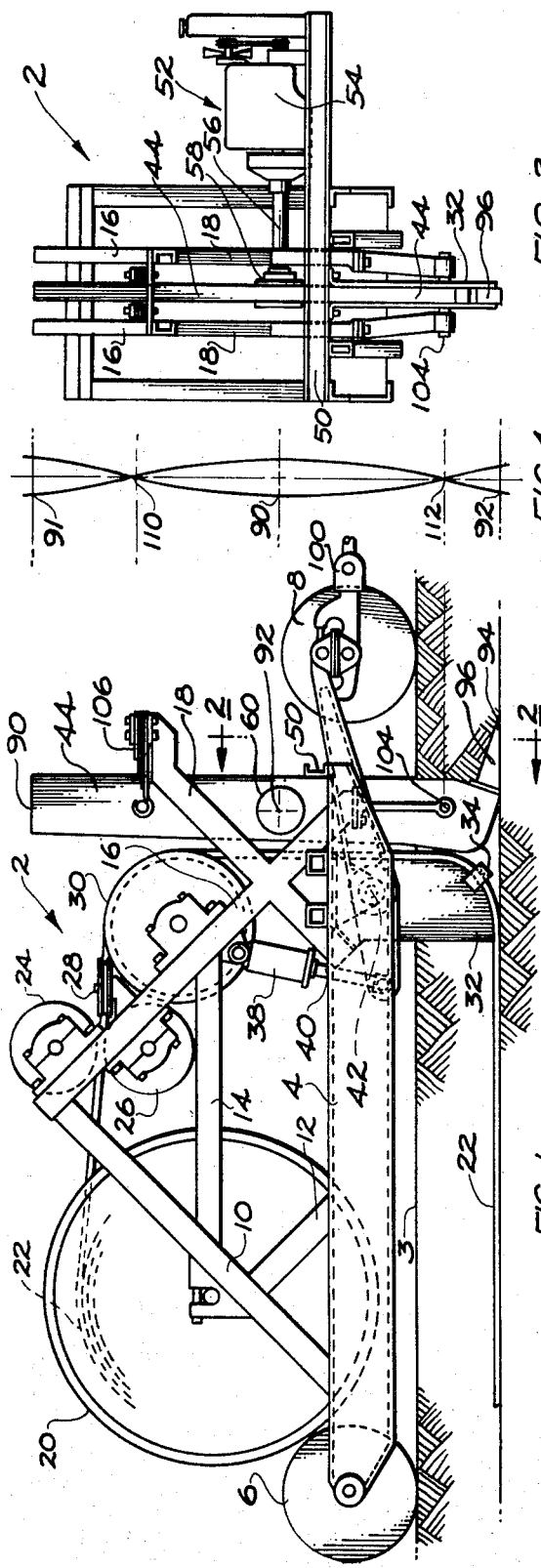
INVENTOR
ALBERT G. BODINE, JR.
BY
ATTORNEY United States Patent Office 3,425,232
Patented Feb. 4, 1969

3,425,232
UNDERGROUND CABLE INSERTING BY SONICS
Albert G. Bodine, Jr., 7877 Woodley Ave.,
Van Nuys, Calif. 91406
Filed Sept. 27, 1965, Ser. No. 490,406
U.S. Cl. 61—72.6          6 Claims
Int. Cl. F16l 1/00

ABSTRACT OF THE DISCLOSURE

Apparatus for laying an underground cable is described. Cable from a supply drum is payed out behind a vertical trench cutting blade which penetrates the ground and which is sonically activated to a resonant frequency such that a velocity antinode occurs near the bottom end of the blade thereby causing the soil to be fluidized to permit the cable to be buried behind the blade without forceful breaking away and removal of the earth structure.

---

This invention relates to a cable or conduit laying mechanism and method for performing same.

More particularly, this invention relates to an apparatus and method for laying a cable or the like under the ground by means of sonic vibration.

In the installation of cables or the like under the ground, it is common practice to employ some means by which a trench is formed in the ground and then a cable placed in the trench with a fill placed over the cable. Typically, a ditch digger is employed to form the trench and a separate apparatus utilized to place the cable in the trench and then some means employed to fill earth back into the trench so as to cover the cable. These means include such apparatus as the well known mole plow or a back hoe. Another very common method of forming a trench is an endless chain with shovels thereon which when pulled forward along the ground forms a trench for the insertion of a cable. Other types of apparatus used include shovels.

All of the above examples while having proved effective in the past suffer disadvantages which this invention obviates. For example, the trenches commonly formed by the prior art devices require large forces to rip the earth and to lift or carry the earth to a point outside of the formed trench. After the cable is laid, more force is required to again lift the earth and return it to the trench.

This invention may be compared to the conventional method for forming trenches and laying cables therein as the conventional drop hammer can be compared with the sonic driving apparatus according to that described in my Patent No. 2,975,846. In the pile driving art, the energy wasted utilizing the conventional pile driving apparatus and technique is enormous and is obviated by utilization of the apparatus and method described in my aforementioned patent.

In the art of pile driving, when a standing wave vibration in the sonic resonant frequency range is imparted to a pile, the pile vibrates typically as a "free-free" bar with a velocity antinode at each end and a node at the midpoint. Under this sort of vibration, the pile undergoes a standing wave vibration, alternately undergoing elastic elongations and contractions. This causes the lower end of the pile to sonically activate the earth whereupon it will be more easily driven downwardly. The static friction between the embedded length of the pile and the surrounding earth is substantially reduced by the presence of additional velocity antinodes which appear along the pile.

It is a similar sort of phenomenon which is employed in the instant invention. The instant invention may be briefly described in one embodiment as a longitudinal, substantially vertical element which is placed in the ground and sonically activated to a resonant frequency such that a velocity antinode occurs at a point substantially near or at the bottom end of the element such that the earth is fluidized to permit the cable to be inserted immediately thereafter without forceful breaking away and removal of the earth structure as in the conventional manner.

It is therefore an object of this invention to provide a novel and improved method for laying cable or the like underneath the surface of a medium such as earth.

Another object of the invention is to provide an improved apparatus for laying cable or the like underneath the surface of a medium such as earth.

Other objects and advantages of this invention will become apparent as this description proceeds, taken in conjunction with drawings in which:

FIGURE 1 is a schematic view of a cable laying device according to this invention;

FIGURE 2 is a view taken along line 2—2 of FIGURE 1;

FIGURE 3 is a view in cross section of the sonic driving apparatus utilized in this invention; and FIGURE 4 is a plot of the standing wave imparted to the driving element.

Referring now to FIGURE 1, a side view of one embodiment according to this invention is shown. The cable laying apparatus is designated generally at 2 and includes a framework 4 which is supported on earth 3 by rollers or wheels 6 and 8. This framework includes bracing structure 10 including frame members 12 and 14 and bracing structure 16 which includes frame member 18. A reel or drum 20 contains cable 22 which is wound thereon. This cable passes between rollers 24 and 26 and around roller 28 and 30 from whence it is guided downwardly around guide member 32 and guide 34. As the device moves to the right as viewed in FIGURE 1, the cable 22 will be rolled off drum 20 as guided by wheels 24, 26, 28, 30, guide member 32 and guide 34. A hydraulic ram and piston assembly 38 is provided so that when the cable laying operation is completed, the piston 40 may be retracted and the device pivoted about pivot 42 in such a manner that longitudinal element 44 and guide 32 are above the ground so that the cable laying device 2 may be transported on wheels 8 and 6 wherever desired.

In FIGURE 2, an end view of the apparatus of FIGURE 1 is shown as viewed along line 2—2 of FIGURE 1. Extending across the front of the cable laying mechanism 2 is a frame member 50 which as viewed in FIGURE 2 extends outwardly to one side of the cable laying mechanism so as to support the sonic driving apparatus shown generally at 52. This apparatus which is described in more detail with reference to FIGURE 3 includes a motor means 54 which through drive shaft 56 rotates the vibrator 58. Vibrator 58 in turn is fitted tightly within aperture 60 (see FIGURE 1) of elastic longitudinal member, bar or cutter 44. Referring to FIGURE 3, the drive shaft 56 emanating from motor 54 is supported by bearings 66 and 68 within member 70 which is rotated by shaft 56. Member 70 has at one end thereof an internal gear 72 which causes element 74 having weights 84 thereon to rotate in an eccentric manner in toothed contact with internal gear teeth 76 on body member 78. Gear teeth 76 intermesh with spur gear teeth 80 on rotating member 74. Rotating member 74 has a plurality of weights 84 which in a manner similar to the sonic oscillator described in my Patent No. 2,960,314 imparts a cyclical vibration to member 44 to which it is attached. In this particular instance, the oscillator shown in FIGURE 3 as it is placed in aperture 60 of longitudinal trench cutter 44 will impart vibrations thereto such that nodes and velocity antinodes are formed if the oscillator is operated at the elastic resonant frequency of member 44. As shown in FIGURE 4, a velocity antinode will occur at point 90, substantially at the center of aperture 60 and at point 92 at the tip 94 of cutter 44.

The longitudinal member or cutter 44 and oscillator 58 may comprise a complete resonant sonic system. Preferably, this resonant system is of fairly high acoustic impedance. Resonant member 44 has a tip or cutter element 96 which may be termed a sonic radiation surface capable of being acoustically coupled to the earth material. The oscillator 58, if operated at the resonant frequency, "locks in" to maintain a resonant frequency in the member 44 in a manner described in my co-pending patent application entitled "Sonic Driver with Pneumatic Capacitance," Ser. No. 443,997, filed Mar. 30, 1965 now Patent No. 3,277,970. The oscillator is also capable of operation at some frequency in excess of the resonant frequency of the longitudinal member 44. As the frequency increases from zero towards this resonant frequency, a very small change in frequency will result in a relatively large change in amplitude at the velocity antinodes 90, 91 and 92. This change in amplitude is reflected as a correspondingly large change in torque at the prime move 52. As a consequence of this large change in torque, the oscillator will be loaded down causing the frequency to decrease which results in a relatively large reduction in velocity amplitude and an attendant reduction in torque. Thus, the frequency tends to lock in at an equilibrium frequency under conditions of a high Q factor. This factor Q is defined as the ratio of energy stored to energy dissipated. In an electrical circuit, this is the ratio of inductive reactance to resistance. In other words, with a high Q factor, the sonic system can store a high level of sonic energy, to which a constant input and output of energy is respectively added and subtracted. In situations where the soil is highly resistive (sonically speaking) the Q factor is low and member 44 is merely operated sonically without resonance. The cable guiding member 32 is located adjacent to and rearwardly of the cutting member 44 such that the soil which is fluidized by member 44 is still in that state as cable 22 is guided into place thus facilitating entry of the cable into the earth.

The device constructed according to this invention serves to "fluidize" the soil. By using sonic vibrations, there is provided, as best expressed by an electrical analogy, inductance, capacitance and resistance. Inductance in an electrical circuit can be likened to the velocity antinodes of a mechanical system. Capacitance is the electrical analogy of elastic stiffness while friction is equated to resistance. The sum of these is impedance.

When driving a pile by a sonic vibrating device such as described in my aforementioned U.S. Patent No. 2,975,846, the elastic stiffness of the pile acts as a reactance or capacitance. The velocity antinodes act as a lumped inductance while the friction between the pile and earth comprise a resistance.

In the instant device, the cable laying structure when operated at the resonant mode acts essentially as a lumped inductance. The stiffness or elastic reactance of the bar or longitudinal element 44 provides the capacitive analogy in an electrical circuit.

Thus, the friction provided by the earth results in the resistance of the electrical analogy. The net result of this is that the earth particles or grains do not vibrate in unison but vibrate in a random manner. Accordingly, the grains of the earth have a certain intermobility and therefor fluidity. By limiting the soil action or vibration to the resistance portion of the impedance, substantially all of the energy of the system is utilized in overcoming the resistance of the earth or other media.

When the soil is fluidized as described supra, the earth penetrating member 44 cuts through the earth much as a knife through butter.

In operation, the sonic resonant system is inserted to the desired depth in the earth. The elastic resonant member 44 then transmits a sonic energy field into the adjacent earth material by means of the radiating surface or member 96. A sonic field is created which causes the local region of the earth material to become very fluid or dynamically, "soft." In this manner, the longitudinal member 44 is urged forward by mechanism 2 such as being pulled through cable 100. The cable is guided into a submerged position in the earth by the urging of feeding mechanism 32 since the activated earth material flows around this cable. As stated previously, the portion of the cable being fed through the mechanism is within the sonic environment created by longitudinal cutting member 44. The cable surfaces are also sonically activated such as to reduce friction between the cable and the earth material and ground guide shoe 32. As a result there is an impedance mismatch such that the sonically activated elements will stand apart during activation. Stresses are thus reduced during the cable installation since it does not have to be forced into the earth material.

As can be noted with reference to FIGURE 1, longitudinal member 44 is attached to the cable laying mechanism by means of springs 106 and holding members 104 which are pivotally or elastically attached to the longitudinal member 44. It is noted also that these pivot points are located at the nodes 110 and 112 of longitudinal member 44 such that relatively little movement occurs. Any stresses encountered such as by hitting a sudden obstruction is absorbed by the springs and accompanying members so as to prevent damage in resonating member 44 and/or the cable laying mechanism 2.

Thus it can be seen that by employing the resonating member 44 in cable laying operations that cables can be laid in almost any material.

What is claimed is:

1. A cable laying device comprising: frame means adapted to be moved along a surface of earth material; cable feeding means mounted on said frame means; guide means operable to depend downwardly from said frame means and adapted to deposit a cable from said feeding means to a position below said surface as said frame means is moved along said surface; an elongated vertically disposed cutter member supported by said frame means comprising an elastic bar, the lower end of which is operable to extend beyond the underside of the frame and adapted to penetrate said surface; means supporting said bar at a pair of spaced apart nodal points; sonic oscillator means, operable at the resonant frequency of said bar, coupled to said bar at an antinode thereof to impart sonic vibration to material beneath said surface adjacent said cable and said guide means at a sonic frequency to fluidize said material, whereby entry of said cable beneath said surface is facilitated.

2. A cable laying device according to claim 1 wherein said supporting means comprises: flexing attachment means secured to said frame means and to said bar at one end of said nodal points; and pivotal support means secured to said frame and to said bar at the other of said nodal points.

3. A cable laying device according to claim 2 wherein said bar is provided with an aperture at said antinode and said oscillator means is placed in said aperture.

4. A cable laying device according to claim 3 including a retractable member movably mounted on said frame means and carrying said guide means and said cutter member, to permit said guide means and said cutter member to be selectively raised above said surface.

5. A cable laying device according to claim 1 wherein said guide means is disposed adjacent to and rearwardly of said cutter member whereby said fluidized material will flow around the portion of said cable being deposited from the lowermost terminus of said guide means.

6. In a cable laying device of the type having a length of cable stored thereon and an implement for furrowing and depositing said cable in the ground, the improvement comprising: a vertically disposed elastic vibratorily resonant member; displaceable means mounting said resonant member at a pair of vertically spaced nodal points; cable guiding means disposed adjacent to and rearwardly of the lower portion of said member; and a source of acoustic energy connected to an antinodal point of said member for excitation of said member at a sonic resonant frequency; said member being drivingly coupled to said furrowing and depositing implement for facilitating the penetration of said member into the ground and for fluidizing the earth at the point of deposition of said cable in the ground from said guiding means.

References Cited

UNITED STATES PATENTS

| | | | |
|---|---|---|---|
| 1,337,184 | 4/1920 | Adams | 61—72.6 |
| 2,949,871 | 8/1960 | Finn | 111—1 |
| 3,030,715 | 4/1962 | Bodine | 37—195 |
| 3,222,876 | 12/1965 | Harmstoy | 61—72.6 X |
| 3,256,695 | 6/1966 | Bodine | 61—72.5 X |

FOREIGN PATENTS

| | | |
|---|---|---|
| 228,865 | 8/1963 | Austria. |
| 687,123 | 5/1964 | Canada. |

EARL J. WITMER, *Primary Examiner.*